US012700604B2

(12) United States Patent
Ringk

(10) Patent No.: US 12,700,604 B2
(45) Date of Patent: Aug. 4, 2026

(54) MEMBRANE-ELECTRODE UNIT FOR AN ELECTROCHEMICAL CELL, AND PROCESS FOR MANUFACTURING A MEMBRANE-ELECTRODE UNIT

(71) Applicant: Robert Bosch GmbH, Stuttgart (DE)

(72) Inventor: Andreas Ringk, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 564 days.

(21) Appl. No.: 18/248,602

(22) PCT Filed: Oct. 13, 2021

(86) PCT No.: PCT/EP2021/078303
§ 371 (c)(1),
(2) Date: Apr. 11, 2023

(87) PCT Pub. No.: WO2022/084121
PCT Pub. Date: Apr. 28, 2022

(65) Prior Publication Data
US 2023/0387440 A1 Nov. 30, 2023

(30) Foreign Application Priority Data

Oct. 19, 2020 (DE) ..................... 10 2020 213 140.6

(51) Int. Cl.
*H01M 8/1004* (2016.01)
*H01M 8/0247* (2016.01)
*H01M 8/1069* (2016.01)
(52) U.S. Cl.
CPC ....... *H01M 8/1004* (2013.01); *H01M 8/0247* (2013.01); *H01M 8/1069* (2013.01)

(58) Field of Classification Search
None
See application file for complete search history.

(56) References Cited

U.S. PATENT DOCUMENTS

2004/0096716 A1 5/2004 Pierpont et al.
2008/0142152 A1* 6/2008 Debe ................... H01M 8/2457
                                                  156/247

(Continued)

FOREIGN PATENT DOCUMENTS

CN 108054406 A 5/2018
DE 10140684 A1 3/2003

(Continued)

OTHER PUBLICATIONS

Translation of International Search Report for Application No. PCT/EP2021/078303 dated Feb. 2, 2022 (2 pages).

(Continued)

*Primary Examiner* — Maria Laios
(74) *Attorney, Agent, or Firm* — Michael Best & Friedrich LLP

(57) ABSTRACT

Disclosed is a membrane-electrode unit (1) for an electrochemical cell (100), wherein the membrane-electrode unit (1) comprises a frame structure (10) for accommodating a membrane (2) coated with electrodes (3, 4). The frame structure (10) comprises a first film (11) and a second film (12), wherein the first film (11) is bonded to the second film (12) in a bonding region (15) by means of an adhesive (13). A spacing structure (20) is formed at least on one of the two films (11, 12), in the bonding region (15).

5 Claims, 2 Drawing Sheets

(56) References Cited

U.S. PATENT DOCUMENTS

| | | | |
|---|---|---|---|
| 2008/0145712 A1* | 6/2008 | Pierpont ............. | H01M 8/0273 |
| | | | 429/534 |
| 2009/0087713 A1 | 4/2009 | Yoshida et al. | |
| 2014/0127608 A1 | 5/2014 | Sakamoto et al. | |
| 2015/0214559 A1 | 7/2015 | Yamamoto et al. | |
| 2020/0331212 A1 | 10/2020 | Kim | |
| 2021/0376336 A1* | 12/2021 | Sakanoi ............. | H01M 8/0206 |

FOREIGN PATENT DOCUMENTS

| | | |
|---|---|---|
| DE | 102011105072 B3 | 11/2012 |
| DE | 102015215496 A1 | 2/2017 |
| DE | 102017000960 A1 | 8/2018 |
| DE | 102018131092 A1 | 3/2020 |
| EP | 1246281 A1 | 10/2002 |
| EP | 1624515 A1 | 2/2006 |
| EP | 3598552 A1 | 1/2020 |
| JP | 2009076309 A | 4/2009 |
| JP | 2009099538 A | 5/2009 |
| JP | 2010140756 A | 6/2010 |
| JP | 2014191981 A | 10/2014 |
| WO | 2007113592 A1 | 10/2007 |

OTHER PUBLICATIONS

Translation of International Search Report for Application No. PCT/EP2021/077443 dated Jan. 21, 2022 (3 pages).

Non-final Office Action issued for U.S. Appl. No. 18/030,676, dated Nov. 4, 2025 (6 pages).

Final Office Action issued for U.S. Appl. No. 18/030,676, dated Jan. 26, 2026 (7 pages).

* cited by examiner

MEMBRANE-ELECTRODE UNIT FOR AN ELECTROCHEMICAL CELL, AND PROCESS FOR MANUFACTURING A MEMBRANE-ELECTRODE UNIT

BACKGROUND

A fuel cell is an electrochemical cell comprising two electrodes separated from one another by means of an ion-conducting electrolyte. The fuel cell converts the energy of a chemical reaction of a fuel directly into electricity using an oxidizing agent. Various types of fuel cells exist.

A specific fuel cell type is the polymer electrolyte membrane fuel cell (PEM-FC). In an active region of a PEM-FC, two porous electrodes having a catalyst layer abut on a polymer electrolyte membrane (PEM). In the active region, the PEM-FC further comprises gas diffusion layers (GDL) which border, on both sides, the polymer electrolyte membrane (PEM) and the two porous electrodes having a catalyst layer. The PEM, the two electrodes having the catalyst layer, and optionally also the two GDL can form a so-called membrane-electrode unit (MEA) in the active region of the PEM-FC. Two opposing bipolar plates (halves) in turn border the MEA on both sides. A fuel cell stack is constructed of MEAs and bipolar plates alternately arranged one above the other. With an anode plate of a bipolar plate, a distribution of the fuel, in particular hydrogen, takes place, and with a cathode plate of the bipolar plate, a distribution of the oxidizing agent, in particular air/oxygen, takes place. In order to electrically isolate adjacent bipolar plates, in order to stabilize the shape of the MEA, and in order to prevent unwanted escape of the fuel or of the oxidizing agent, the MEA can be enclosed in a frame-like opening of two films arranged on one another. Typically, the two films of this frame structure are made of the same material, e.g., polyethylene naphthalate (PEN). The two films formed from the same material may have dispensable redundant properties, such as an electrical insulating capability (electrically insulating) and/or an oxygen-tightness of each of the two films.

DE 101 40 684 A1 discloses a membrane-electrode unit for a fuel cell, containing a layer arrangement consisting of an anode electrode, a cathode electrode, and a membrane arranged between them, wherein a polymeric material is applied to an upper and a lower side of the layer arrangement.

DE 10 2018 131 092 A1 comprises a membrane-electrode unit with a frame structure.

SUMMARY

An object of the present invention is to prevent adhesive from being squeezed out of the frame structure of a membrane-electrode unit and preferably to obtain a defined height of the frame structure.

For this purpose, the membrane-electrode unit comprises a frame structure for accommodating a membrane coated with electrodes. The frame structure comprises a first film and a second film, wherein the first film is bonded to the second film in a bonding region by means of an adhesive. At least on one of the two films, a spacing structure is formed in the bonding region.

The spacing structure is in direct contact with the adhesive, thus serving the purpose of adhesion, but is stiff enough to effectively prevent the adhesive from being squeezed out of the frame structure. The spacing structure is thus also a mechanical stiffener of the film. Preferably, the modulus of elasticity of the material of the spacing structure is at least 10 times as large as the modulus of elasticity of the adhesive. Furthermore, the spacing structure preferably has a stiff geometry and is, in particular, honeycombed. As a result, the clamping forces of the cell stack can be transferred via the comparatively stiff spacing structure, and excessive deformation of the adhesive and resultant squeezing-out are prevented. The spacing structure can thus also set a closely tolerable height of the frame structure. The spacing structure thus sets a defined spacing between the two films and prevents further compression of the frame structure during the stacking process, and thus squeezing-out of the adhesive. A defined height of the electrochemical cell is thus robustly maintained.

In preferred embodiments, the spacing structure forms adhesive pockets in which the adhesive is virtually volumetrically trapped. The volume of adhesive per area unit is thereby defined so that the height can be set particularly robustly.

The membrane-electrode unit may comprise a membrane, in particular a polymer electrolyte membrane (PEM). The membrane-electrode unit may further comprise two porous electrodes each having a catalyst layer, wherein said electrodes are in particular arranged on the PEM and border it on both sides. This may in particular be referred to as an MEA-3. Additionally, the membrane-electrode unit may comprise two gas diffusion layers. These gas diffusion layers may in particular border the MEA-3 on both sides. This may in particular be referred to as an MEA-5.

For example, the electrochemical cell may be a fuel cell, an electrolysis cell or a battery cell. The fuel cell is in particular a PEM-FC (polymer electrolyte membrane fuel cell). In particular, a cell stack comprises a plurality of electrochemical cells arranged one above the other.

The frame structure in particular has a frame shape. The frame structure is preferably circumferential. A membrane and the two electrodes can thus be particularly advantageously enclosed in the frame structure. Furthermore, the frame structure in cross section is in particular U-shaped or Y-shaped for accommodating the membrane and the two electrodes are formed between the legs of the U-shape or Y-shape.

The adhesive preferably seals the membrane-electrode unit toward the outside, glues the two films to one another and fixes the membrane with the two electrodes in the frame structure.

The adhesive can further preferably be electrically insulating. The frame structure can thus be particularly advantageously electrically insulating and an unwanted flow of current in an inactive region of the electrochemical cell is particularly advantageously kept low, in particular prevented.

Further preferably, the spacing structure(s) can also be insulating, in particular electrically insulating so that an unwanted flow of current is prevented.

In advantageous further developments, a gas diffusion layer is attached to the frame structure by means of a further adhesive. Advantageously, the films each likewise comprise at least one spacing structure in the direction of the further adhesive. Here too, the spacing structures are preferably designed according to any of the above-described embodiments.

The invention also comprises a process for manufacturing a membrane-electrode unit according to any of the above embodiments. The process comprises the following process steps:

applying the spacing structure to the first film, applying the adhesive to the spacing structure, optionally
into the adhesive pockets, gluing the first film to the second film in the bonding
region with an intermediate layer of the membrane in
portions outside the bonding region.

Preferably, the spacing structure is applied to the first film
by means of heated embossing rollers. The curing of the
adhesive advantageously takes place while applying a com-
pressive load.

When the two films are glued, they are preferably glued
only at the lower leg of the Y-shape, i.e., in the bonding
region; the membrane is arranged between the two other
legs. The membrane can also be glued to both films.

BRIEF DESCRIPTION OF THE DRAWINGS

Further measures improving the invention arise from the
following description of a few exemplary examples of the
invention, which are schematically illustrated in the figures.
All of the features and/or advantages arising from the
claims, description or drawings, including structural details,
spatial arrangements and process steps, may be essential to
the invention both by themselves and in the various com-
binations. It should be noted that the figures have only a
descriptive character and are not intended to restrict the
invention in any way.

The following are shown schematically.

DETAILED DESCRIPTION

Figure 1:
FIG. 1 a membrane-electrode unit from the prior art,
wherein only the essential regions are shown.
Figure 1:
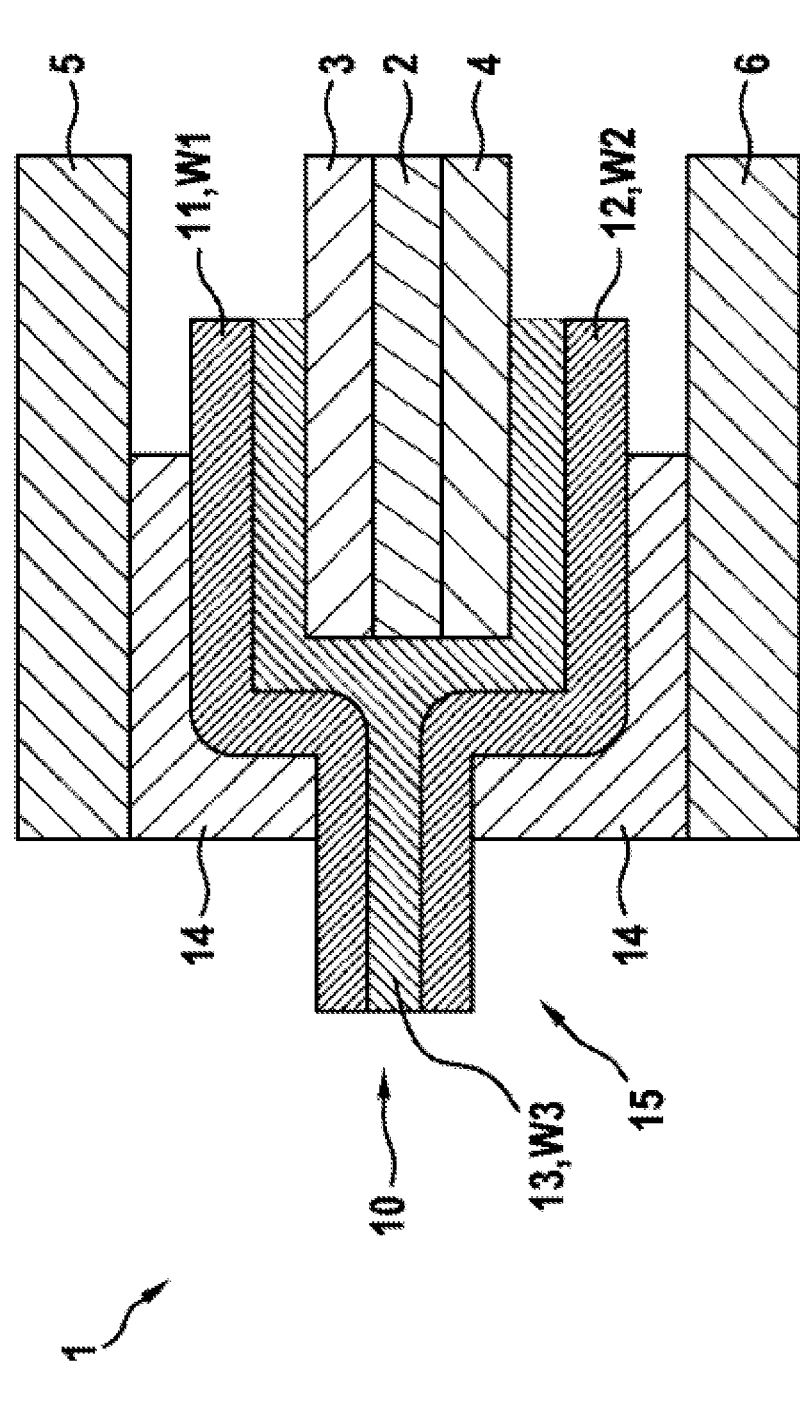

FIG. 1 shows a vertical section of a membrane-electrode
unit 1 of an electrochemical cell 100, in particular of a fuel
cell, from the prior art, wherein only the essential regions are
shown.

The membrane-electrode unit 1 comprises a membrane 2,
by way of example a polymer electrolyte membrane (PEM),
and two porous electrodes 3 and 4 each having a catalyst
layer, wherein the electrodes 3 and 4 are each arranged on
one side of the membrane 2. The electrochemical cell 100
further comprises in particular two gas diffusion layers 5 and
6, which, depending on the embodiment, may also belong to
the membrane-electrode unit 1.

The membrane-electrode unit 1 is circumferentially sur-
rounded by a frame structure 10, this is also referred to as a
sub-gasket. The frame structure 10 serves to provide stiff-
ness and tightness to the membrane-electrode unit 1 and is
a non-active region of the electrochemical cell 100.

The frame structure 10 is in particular U-shaped or
Y-shaped in section, wherein a first leg of the U-shaped
frame portion is formed by a first film 11 from a first material
W1 and a second leg of the U-shaped frame portion is
formed by a second film 12 from a second material W2. In
addition, the first film 11 and the second film 12 are glued
together in a bonding region 15 by means of an adhesive 13
made of a third material W3. The first material W1 and the
second material W2 are often identical.

The two gas diffusion layers 5 and 6 are in turn each
arranged on one side of the frame structure 10 by means of a further adhesive 14, usually such that they are in contact
with one electrode 3, 4 each via the active surface of the
electrochemical cell 100.

When clamping several electrochemical cells 100 into a
cell stack, there is a risk that the adhesive 13 will be
squeezed out of the frame structure 10. This may result in
leakage of the membrane-electrode unit 1 and, consequently,
even total failure of the entire cell stack.

According to the present invention, only one or both films
11, 12 are now provided with a spacing structure 20 at least
in the bonding region 15 so that a defined spacing between
these two films 11, 12 is maintained and the adhesive 13 is
prevented from being squeezed out. Preferably, the films 11,
12 and the spacing structure 20 are significantly stiffer,
preferably 10 times as stiff as the cured adhesive 13 so that
the spacing structure 20 can transfer corresponding preten-
sioning forces of the cell stack without being deformed too
much.

Figure 2:
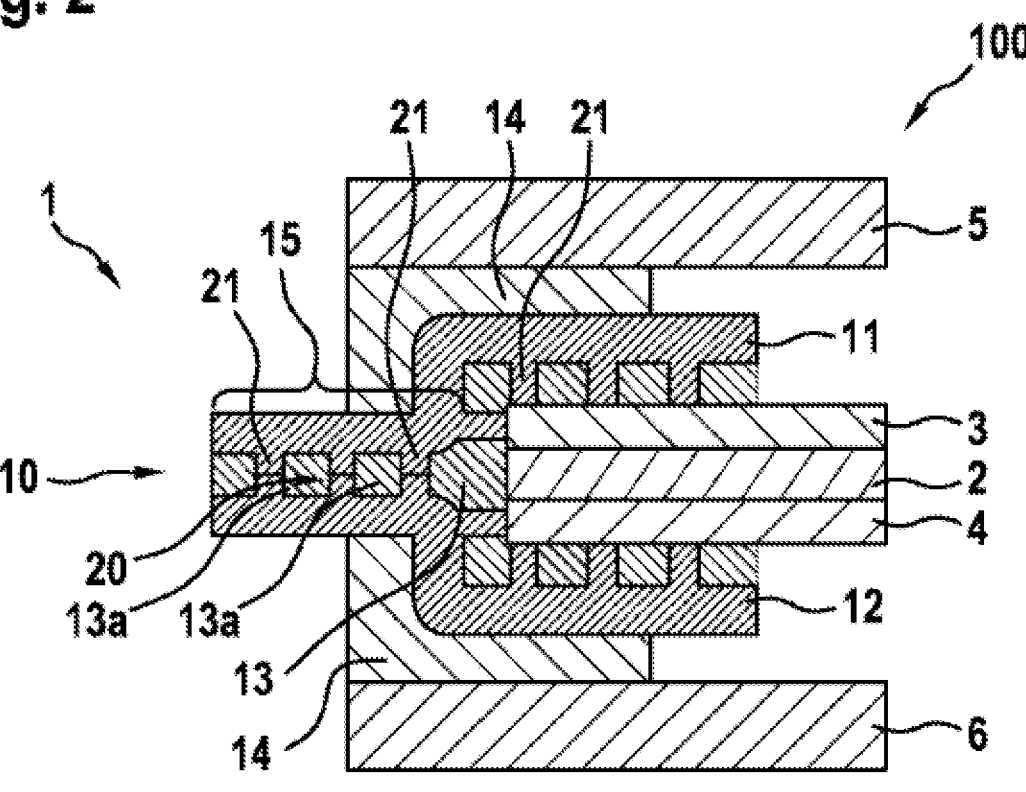
FIG. 2 a membrane-electrode unit according to the inven-
tion, wherein only the essential regions are shown.

For this purpose, FIG. 2 shows spacing structures 20
which are formed on the two films 11, 12 in the direction of
the adhesive 13. In the cross section of FIG. 2, the spacing
structures 20 have the shape of bars 21, which are arranged
to one another such that they form adhesive pockets 13a, in
which the adhesive 13 is enclosed.

Preferably, the height of the bars 21 of the spacing
structure 20 corresponds to the height to which the adhesive
13 is to be compressed during the clamping of the cell stack.
Further compressing is avoided due to the comparatively
high stiffness of the spacing structure 20 or its bars 21.

The spacing structures 20 transfer the clamping force of
the cell stack in the compressed state from the first film 11
to the second film 12 and maintain a defined spacing of the
two films 11, 12 to one another; pushing the adhesive 13 out
of the frame structure 10 is thus avoided. The shapes of the
spacing structures 20 may, for example, be groove-shaped or
honeycombed. The spacing structure 20 may be limited to
the bonding region 15 or, as in FIG. 2, may be formed over
the entire surface of the films 11, 12.

Figure 3:
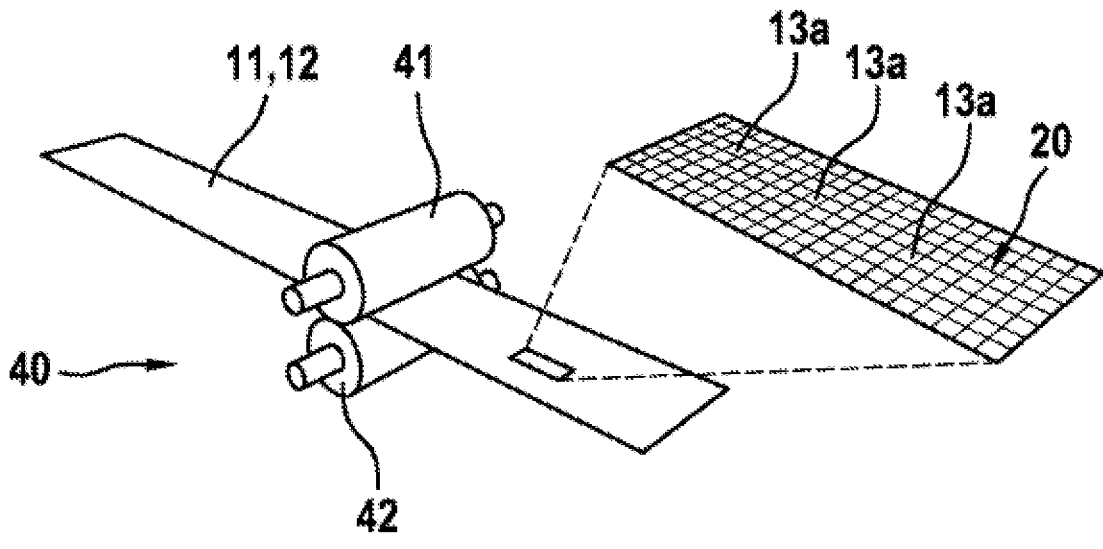
FIG. 3 schematically the manufacturing of a spacing
structure in a film for a membrane-electrode unit, wherein
only the essential regions are shown.

FIG. 3 schematically shows the manufacturing of a film
11, 12 with a spacing structure 20 in a perspective view. The
spacing structure 20 is molded or embossed into the film 11,
12 by means of a tool 40; in the embodiment of FIG. 3 as
a rectangular structure so that a plurality of rectangular
adhesive pockets 13a is formed. In the embodiment of FIG.
3, the tool 40 is two-part and consists of two embossing
rollers 41, 42, through which the film 11, 12 runs and which
have the negative shape of the spacing structure 20. Option-
ally, the two embossing rollers 41, 42 can be heated; this
improves the formability of the films 11, 12 because they can
be heated.

The spacing structures 20 can be applied to the films 11,
12 on one side or on both sides, depending on whether they
are only to cooperate with the adhesive 13 between the two
films 11, 12 or also with the further adhesive 14 toward the
gas diffusion layers 5, 6.

Advantageously, the material of the spacing structures 20
is identical to that of the associated film 11, 12, preferably
a thermoplastic polymer, such as PEN. Furthermore, the
material of the spacing structures 20 preferably has a modu-
lus of elasticity that is at least 10 times stiffer than that of the
adhesive 13 so that the spacing structures 20 can also
effectively transfer the clamping forces and prevent the
adhesive 13 from being squeezed out.

One or both films 11, 12 can also be analogously provided
with spacing structures 20 toward the further adhesive 14,
i.e., between the frame structure 10 and the two gas diffusion
layers 5, 6.

The invention also comprises the manufacture of a membrane-electrode unit according to any of the embodiments described. The following manufacturing steps are carried out:

applying the spacing structure 20 to the first film 11.

applying the adhesive 13 to the spacing structure 20, optionally into the adhesive pockets 13a.

gluing the first film 11 to the second film 12 in the bonding region 15 with an intermediate layer of the membrane 2 in portions outside the bonding region 15.

Preferably, the spacing structure 20 is applied to the first film 11 by means of heated embossing rollers 41, 42, wherein an analogous spacing structure 20 can also be applied to the second film 12. The curing of the adhesive 13 advantageously takes place while applying a compressive load and/or heating.

The invention claimed is:

1. A membrane-electrode unit (1) for an electrochemical cell (100), wherein the membrane-electrode unit (1) comprises a frame structure (10) for accommodating a membrane (2) coated with electrodes (3, 4), wherein the frame structure (10) comprises a first film (11) and a second film (12), wherein the first film (11) is bonded to the second film (12) in a bonding region (15) by an adhesive (13), wherein on at least one of the two films (11, 12), a spacing structure (20) is formed in the bonding region (15);

wherein the spacing structure (20) is honeycombed, and wherein the spacing structure (20) defines adhesive pockets (13a).

2. The membrane-electrode unit (1) according to claim 1, wherein a modulus of elasticity of a material of the spacing structure (20) is at least 10 times as large as a modulus of elasticity of the adhesive (13).

3. A process for manufacturing a membrane-electrode unit (1) according to claim 1, the process comprising:

applying the honeycombed spacing structure (20) to the first film (11), applying the adhesive (13) to the adhesive pockets (13a) of the spacing structure (20), gluing the first film (11) to the second film (12) in the bonding region (15) with an intermediate layer of the membrane (2) in portions outside the bonding region (15).

4. The process according to claim 3, wherein the spacing structure (20) is applied to the first film (11) by two embossing rolls (41, 42).

5. The process according to claim 4, wherein the embossing rolls (41, 42) are heated.

* * * * *